United States Patent [19]

Klink

[11] Patent Number: 4,671,447

[45] Date of Patent: Jun. 9, 1987

[54] WELDING RING ARRANGEMENT

[75] Inventor: Rainer Klink, Kernen, Fed. Rep. of Germany

[73] Assignee: Deutsche Automobilgesellschaft mbH, Fed. Rep. of Germany

[21] Appl. No.: 872,929

[22] Filed: Jun. 11, 1986

[51] Int. Cl.$^4$ ............................................. B23K 37/06
[52] U.S. Cl. ........................................ 228/50; 267/158
[58] Field of Search .......................... 228/50, 184, 216; 267/158, 160, 164

[56] References Cited

U.S. PATENT DOCUMENTS

| | | | |
|---|---|---|---|
| 1,962,350 | 6/1934 | Kane | 228/50 |
| 2,960,301 | 11/1960 | Roman | 267/158 X |
| 3,080,160 | 3/1963 | Orner | 267/160 |
| 3,960,311 | 6/1976 | Griffiths | 228/50 |

Primary Examiner—Kenneth J. Ramsey
Attorney, Agent, or Firm—Barnes & Thornburg

[57] ABSTRACT

The welding ring described connects two housing parts of an electrical battery with electrode stacks arranged symmetrically relative to the welding seam. The ring is provided with spring tongues pointing radially inward and axially upward and downward which hold the electrode end plates on their end faces against an appropriately shaped bearing point so as to center them and retain them in their axial position. This arrangement makes it easier to weld the housing and prevents welding beads from penetrating into the container. Also, additional retention of the electrode stack is ensured.

9 Claims, 6 Drawing Figures

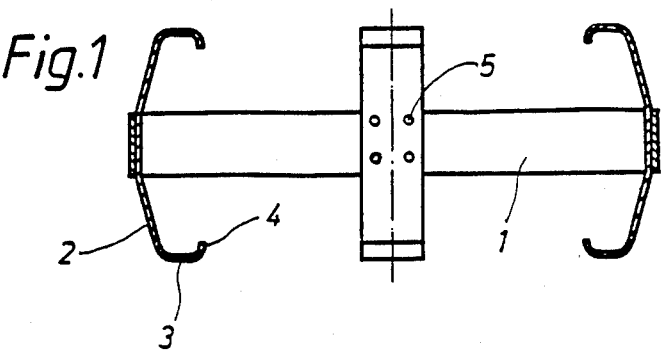
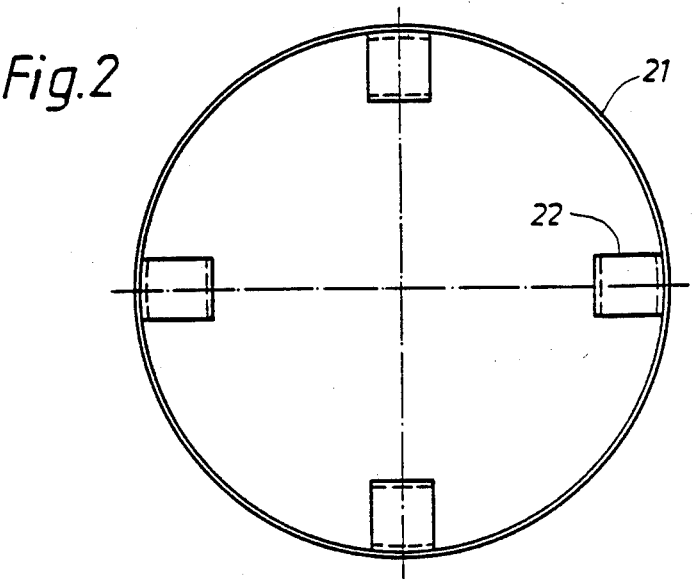
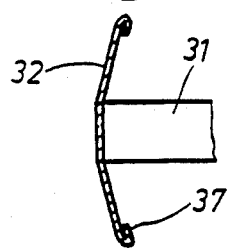 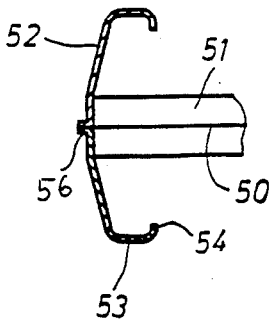

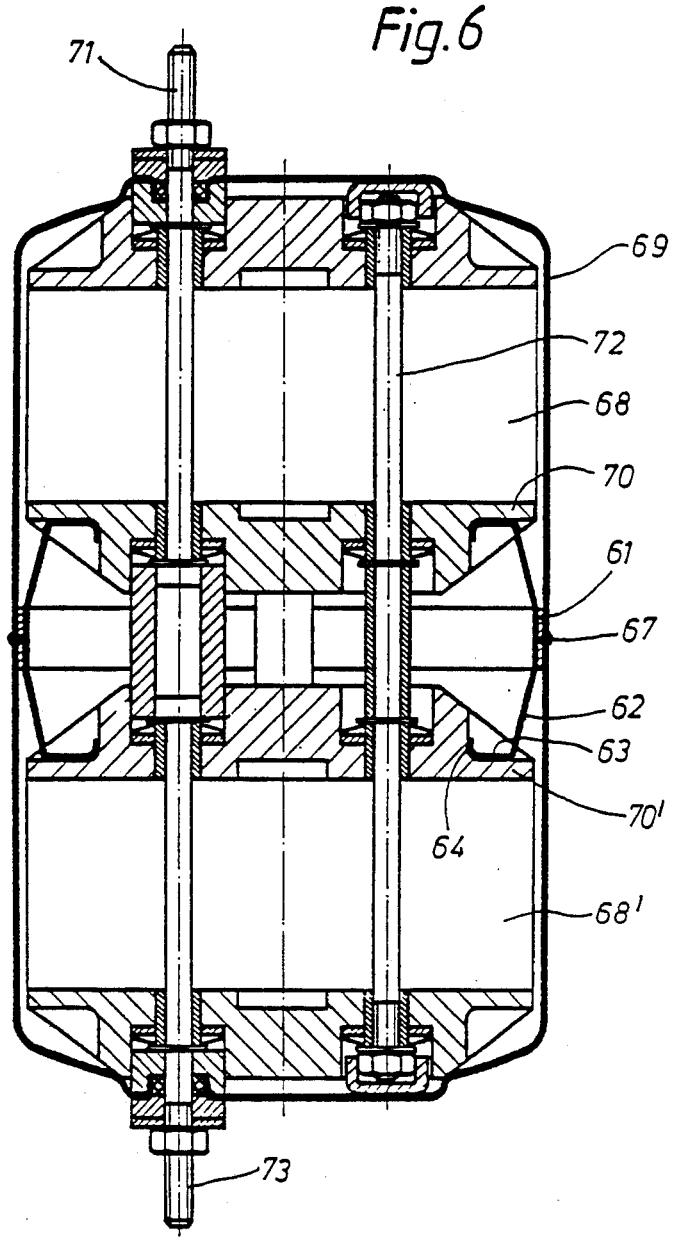

WELDING RING ARRANGEMENT

BACKGROUND AND SUMMARY OF THE INVENTION

The present invention relates to a welding ring for connecting two housing parts of an electrical battery with electrode stacks arranged on both sides of a welding seam.

Relatively large pressure-tight electrical batteries, for example nickel/hydrogen cells, contain several electrode stacks connected electrically in series or in parallel. The housing for such batteries consists of a pressure-tight cylindrical casing which is composed of two housing halves connected by means of a radial joining weld. To prevent the electrode stacks from being damaged by the welding heat, the welding seam is arranged so that, as seen axially, it is located between two electrode stacks. Since the housing is joined together only after the electrode stacks have been constructed, welding beads must be reliably prevented from penetrating into the battery. Welding rings are conventionally used for this purpose. These rings cover from the inside the seam to be welded and thus prevent welding beads from penetrating into the housing. The welding rings also make it easier to center the two housing halves.

Such a welding ring is illustrated, for example, in U.S. Pat. No. 4,411,970. In this case, however, the battery contains only one electrode stack, and because of this the wall distance between the welding seam and the electrode stack is relatively great.

Furthermore, the welding ring according to U.S. Pat. No. 4,411,970 contains a nose which, when the ring is fitted, rests on the housing wall and prevents the ring from inadvertently slipping when the second housing half is pushed on.

In modern nickel/hydrogen cells, the cell housing is filled radially in an improved way. Because of the short radial distances between the electrode stack and the vessel wall, for thermal reasons, the housing can be welded only when the welding seam is located between two electrode stacks. However, where these larger housing containing several electrode stacks are concerned, there is the additional problem of holding the electrode stacks securely, so that contact between the electrode plates and the wall, which can result in short-circuits, is avoided.

An object of the present invention is to provide a welding ring which contributes to retention of the electrode stacks.

This object is achieved by providing a welding ring with spring tongues pointing radially inward and axially upward and downward. The spring tongues hold the electrode end plates of two opposing electrode stacks on their end faces against an appropriately shaped bearing point so as to center them and retain them axially. After the housing halves have been welded together, the welding ring is connected firmly to the container wall and the angled spring tongues fix the end plates of the electrode stacks as desired. To increase the bearing surface of the spring tongues on the electrode end plates, it is advantageous if the spring tongues are bent at their ends approximately perpendicularly relative to the axis of the ring. It is also advantageous if the free ends of the spring tongues are flanged so as to prevent the tongues (conventionally consisting of CrNi spring steel) from cutting sharply into the electrode end plates.

Further objects, features, and advantages of the present invention will become more apparent from the following description when taken with the accompanying drawings, which show for purposes of illustration only, an embodiment constructed in accordance with the present invention.

BRIEF DESCRIPTION OF THE DRAWINGS

FIG. 1 shows a longitudinal section through a welding ring in accordance with the present invention;

FIG. 2 shows a plan view of a welding ring in accordance with the present invention;

FIG. 3 shows a part longitudinal section through a welding ring in accordance with the present invention;

FIG. 4, shows a part longitudinal section through a welding ring in accordance with the present invention;

FIG. 5, shows a part longitudinal section through a welding ring in accordance with the present invention; and FIG. 6, shows the construction of a gas-tight dual cell in longitudinal section in accordance with the present invention.

DETAILED DESCRIPTION OF THE DRAWINGS

FIG. 1 illustrates a welding ring 1 which is provided with 4 spring tongues 2. The spring tongues are connected to the ring 1 by means of spot welds 5. It can be seen that the spring tongues point radially inward and axially upward and downward. The end 3 of each of the spring tongues is bent approximately perpendicularly relative to the axis and forms an axial stop. The radial stop is formed by the bent-round end.

FIG. 2 shows the welding ring according to FIG. 1 in a plan view. The welding ring 21 and the spring tongues 22 can be seen. FIG. 3 shows a part longitudinal section through a welding ring. It illustrates the welding ring 31 and the spring tongue 32 which is flanged at its ends 37. It can also be seen from FIG. 3 that the ring 31 and the spring tongues 32 are produced integrally. In the production of a multiplicity of welding rings it is preferable to manufacture integral rings which are made by being stamped and shaped from an appropriate material. In the production of a relatively small number, a welding ring composed of several parts, as illustrated in FIG. 1, is used instead.

When a welding ring according to FIG. 3 is used, an appropriate groove, into which the end 37 of each of the spring tongues engages, is provided in the end plates of the electrode stacks. Alternatively the electrode end plates will be provided with a boss, annular bead or the like, against which the end 37 comes to rest.

FIG. 4 shows a part longitudinal section through a welding ring 41, in which the spring tongues 42 pointing upward and downward are rounded in a pronounced way. The spring tongues are provided at their ends with a bend 43 approximately perpendicular to the axis and are further bent round at their end 44 to form a radial stop.

FIG. 5 shows a welding ring with a welding edge 56 directed outward. The ring 51 is provided, in the plane of division 50, with a fold which forms the welding edge 56. The spring tongues 52 are again provided with a bend 53 and a radial stop 54.

The number of spring tongues is not restricted to the number shown in FIG. 2, namely four tongues pointing upward and downward. On the contrary, fewer or more sprinq tonques are contemplated. It is merely necessary to ensure, at the same time, that the electrode end plates are supported uniformly. In general, at least two, but preferably at least three spring tongues distributed symetrically will be provided for each electrode end plate. There is essentially no upper limit to the number of spring tongues, apart from the space available. The more spring tongues there are, the more rigid the mounting becomes. The spring tongues pointing upward and downward also need not be located opposite one another, but can be distributed in another way over the periphery of the welding ring.

FIG. 6 shows the construction of a gas-tight dual cell in longitudinal section. This is a cell in which electrode stacks, connected electrically in series, are accommodated in a housing 69. As a result, the cell voltage is doubled, but, in the same way as in a single cell, only two terminal bushings are required. Here, the upper left-hand terminal tie bolt 71 is connected to the upper cell stack 68 only. The right-hand terminal tie bolt 72 passes through both stacks. The lower left-hand terminal tie bolt 73 is again only in contact with the lower cell stack 68'. The positive electrodes of the upper stack 68 are in contact with the upper left-hand terminal tie bolt 71, and the negative electrodes are in contact with the upper part of the continuous terminal tie bolt 72. As regards the lower stack, the situation is exactly the opposite. Thus, the continuous terminal tie bolt is the cell connector of the two cell stacks.

The terminal tie bolt 71 guided through and out of the upper part of the cell 69 serves as the positive connecting terminal and the terminal tie bolt 73 guided through at the bottom serves as the negative connecting terminal. The two terminal bolts 71 and 73 are connected to one another by means of a plastic sleeve. The housing 69 is composed of two halves which are connected symmetrically relative to the two cell stacks 68 and 68' by means of a welding seam 67. Located under the welding seam 67 is the welding ring 61 with its spring tongues 62 pointing upwards and downwards. The spring tongues are provided, at each of their ends, with a bend 63 which extends approximately perpendicularly relative to the axis and which holds the end plates 70 and 70' of the two cell stacks against an appropriately shaped bearing point and retains the cell stacks against axial displacement.

The ends 64 of the bends 63 are shown as being round. Also contemplated are flanged ends which form a radial stop supporting the cell stack against radial displacements. Since, when the two housing halves are welded together, the welding ring is also welded to the housing wall, a very secure retention is obtained.

As a result of the spring effect of the spring tongues, the welding ring exerts a portion of the spring effect for pressing the cell stack together. It is contemplated in this way, to do without springs at the ends of the stacks which would otherwise be required to press the stacks together. The welding ring is readily suitable for cells of the type shown in FIG. 6, in which the electrode stacks are in contact with one another via fixed terminal bolts. It is also particularly suitable for cells wherein contacting is by means of lugs, and wherein the cell stacks are not guided by fixed terminal bolts.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed is:

1. A welding ring comprising:
   welding ring body means, and
   a plurality of cantilevered spring tongue means attached to said welding ring body means, a first one of said spring tongue means extending radially inward and in a first axially direction, from said ring body means, and
   a second one of said spring tongue means extending inward and in an opposite axial direction from said body means.

2. A welding ring according to claim 1, wherein said spring tongue means have bent end portions extending transversely relative to a central axis of said ring body means.

3. A welding ring comprising:
   a welding ring body means, a plurality of spring tongue means attached to said welding ring body means, a first one of said spring tongue means extending radially inward and in a first axially direction, from said ring body means, and
   a second one of said spring tongue means extending inward and in an opposite axial direction from said body means, wherein ends of said transversely extending end portions are flanged toward said ring body means.

4. A welding ring according to claim 1, comprising at least two spring tongue means in each axial direction.

5. A welding ring according to claim 1, including four spring tongue means.

6. A welding ring according to claim 5, wherein said spring tongue means are symmetrically arranged about said welding ring body means.

7. A welding ring comprising:
   a welding ring body means, a plurality of spring tongue means attached to said welding ring body means, a first one of said spring tongue means extending radially inward and in a first axially direction, from said ring body means, and
   a second one of said spring tongue means extending inward and in an opposite axial direction from said body means, wherein said welding ring body means includes an outwardly directed welding edge.

8. A welding ring according to claim 1, wherein said spring tongue means are spot welded to said welding ring body means.

9. A welding ring according to claim 1, wherein said spring tongue means are integral with said welding ring body means.

* * * * *